(12) United States Patent
Buyukkokten

(10) Patent No.: US 10,331,781 B2
(45) Date of Patent: Jun. 25, 2019

(54) TEMPLATE COMPILATION USING VIEW TRANSFORMS

(71) Applicant: Google LLC, Mountain View, CA (US)

(72) Inventor: Ferhat Buyukkokten, Palo Alto, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 15/616,205

(22) Filed: Jun. 7, 2017

(65) Prior Publication Data

US 2018/0011832 A1 Jan. 11, 2018

Related U.S. Application Data

(60) Provisional application No. 62/358,364, filed on Jul. 5, 2016.

(51) Int. Cl.
*G06F 8/41* (2018.01)
*G06F 8/52* (2018.01)
*G06F 17/24* (2006.01)
*G06F 17/27* (2006.01)

(52) U.S. Cl.
CPC .......... *G06F 17/248* (2013.01); *G06F 8/41* (2013.01); *G06F 8/443* (2013.01); *G06F 8/52* (2013.01); *G06F 17/272* (2013.01)

(58) Field of Classification Search
CPC .............. G06F 8/41; G06F 8/443; G06F 8/52
USPC ........................................ 717/136, 140, 154
See application file for complete search history.

(56) References Cited

U.S. PATENT DOCUMENTS

| 7,047,318 B1* | 5/2006 | Svedloff | G06F 16/958 709/246 |
| 2002/0103858 A1* | 8/2002 | Bracewell | G06F 17/248 709/203 |
| 2003/0140068 A1* | 7/2003 | Yeung | G06F 16/957 |
| 2004/0034830 A1* | 2/2004 | Fuchs | G06F 17/2258 715/234 |
| 2005/0066273 A1* | 3/2005 | Zacky | G06F 17/2247 715/249 |
| 2006/0242563 A1* | 10/2006 | Liu | G06F 17/2247 715/234 |
| 2009/0222721 A1* | 9/2009 | Parkinson | G06F 16/9535 715/234 |
| 2011/0078671 A1* | 3/2011 | Perry | G06F 8/443 717/152 |

(Continued)

OTHER PUBLICATIONS

Schott et al., "Lazy XSL Transformations" (Year: 2003).*

(Continued)

*Primary Examiner* — Phillip H Nguyen
(74) *Attorney, Agent, or Firm* — Fish & Richardson P.C.

(57) ABSTRACT

Methods, systems, and apparatus include computer programs encoded on a computer-readable storage medium for template compilation. A method includes: identifying, within a portion of code, a code template; parsing the template to identify a defined transform and a DOM node to which the transform is to be applied; generating, based on the defined transform and the DOM node, a set of code that transforms the DOM node according to the defined transform; replacing the DOM node with the set of code; and transmitting, to a user device, the set of code to present the transformed DOM node at the user device.

20 Claims, 5 Drawing Sheets

(56) References Cited

U.S. PATENT DOCUMENTS

2017/0111431 A1* 4/2017 Scoda .................. G06F 16/986
2017/0169100 A1* 6/2017 Reshadi ................. G06F 21/64

OTHER PUBLICATIONS

'en.wikipedia.org [online] "Template processor," Dec. 23, 2015, [retrieved on Jun. 6, 2017 via Wayback Machine Internet Archive] Retrieved from Internet: URL<https:/en.wikipedia.org/wiki/Template_processor> via Internet Archive URL<https://web.archive.org/web/20151223104608/https:/en.wikipedia.org/wiki/Template_processor> 4 pages.

'en.wikipedia.org' [online] "Document Object Model," Feb. 22, 2016, [retrieved on Jun. 6, 2017 via Wayback Machine Internet Archive] Retrieved from Internet: URL<https:/en.wikipedia.org/wiki/Document_Object_Model> via Internet Archive URL<https://web.archive.org/web/20160222183450/https:/en.wikipedia.org/wiki/Document_Object_Model> 4 pages.

'w3schools.com' [online] "AngularJS Introduction," Dec. 31, 2015, [retrieved on Jun. 6, 2017 via Wayback Machine Internet Archive] Retrieved from Internet: URL<https://www.w3schools.com/angular/angular_intro.asp> via Internet Archive URL<https://web.archive.org/web/20151231122634/https:/www.w3schools.com/angular/angular_intro.asp>.

'www.polymer-project.org/1.0/' "Production Ready: Polymer 1.0," Dec. 31, 2015, [retrieved on Jun. 6, 2017] Retrieved from Internet: URL< https:/www.polymer-project.org/1.0/> via Internet Archive URL< https://web.archive.org/web/20151231121744/https:/www.polymer-project.org/1.0/> 6 pages.

\* cited by examiner

Template1 (Conditional Transform) ⟵ 200

```
1  <particle-element name="tools-cell" tabindex="-1">
2    <div if="{{selectable}}">
3      <mat-checkbox checked="{{selected}}" on-checked="onChange"></mat-checkbox>
4    </div>
5  </particle-element>
```

```
1  @ParticleView('tools-cell')
2  class ToolsCellView implements View {
3    HashMap<String, dynamic> localStore;
4    TableRowToolsController controller;
5    Element node;
6    Element ip;
7    View _toolscellview_0;
8    ViewConditionalTransform transform1;
9
10   ToolsCellView(Controller parentController) {
11     controller = new TableRowToolsController(parentController);
12   }
13
14   void build() {
15     node = document.createElement('tools-cell');
16     particleProbes.add(node, controller);
17     ip = new DivElement();
18     node.append(ip);
19     transform1 = new ViewConditionalTransform();
20     assert(() {
21       transform1.debugExpr = '{{selectable}}';
22       return true;
23     });
24     _toolscellview_0 = transform1.transform(new ToolsCellView_0(controller));
25     node.setAttribute('tabindex', '-1');
26   }
27
28   void bind() {
29     transform1.transformValue = controller.selectable;
30     _toolscellview_0.build();
31     new ViewInsertionPoint(ip).content = _toolscellview_0.node;
32     _toolscellview_0.bind();
33   }
34
35   void attachView() {
36     _toolscellview_0.attachView();
37   }
38
39   void detachView() {
40     while (node.lastChild != null) node.lastChild.remove();
41     _toolscellview_0.detachView();
42     controller.detach();
43     particleProbes.remove(node);
44   }
45 }
```

FIG. 2B

- <custom- 302
- <tab 304
  - <tr repeat="row in 306  ⎯308  ⎯309  ⎯319
    - <th repeat="column in 310
      - 318
      - <div class="header- ⎯312
      - <button class="column- ⎯314
        - <shape if="{{column.isSortable}}" 316
        - 320   322 view
view
view

FIG. 3  300

TEMPLATE COMPILATION USING VIEW TRANSFORMS

BACKGROUND

This specification relates to template compilation.

A template processor can combine a template with data to produce a result document. A result document can be, for example, a web page. A template can be written using a templating language. The template processor can process the code in the template, connect to a data source, and can, for example, replace placeholders included in the template with data obtained from the data source. A template processor can execute, for example, on a web server or in a web browser.

SUMMARY

In general, one innovative aspect of the subject matter described in this specification can be implemented in methods that include a method for compiling a template. The method includes: identifying, within a portion of code, a code template; parsing the template to identify a defined transform and a DOM node to which the transform is to be applied; generating, based on the defined transform and the DOM node, a set of code that transforms the DOM node according to the defined transform; replacing the DOM node with the set of code; and transmitting, to a user device, the set of code to present the transformed DOM node at the user device.

In general, another aspect of the subject matter described in this specification can be implemented in computer program products. A computer program product is tangibly embodied in a computer-readable storage device and comprises instructions. The instructions, when executed by a processor, cause the processor to: identify, within a portion of code, a code template; parse the template to identify a defined transform and a DOM node to which the transform is to be applied; generate, based on the defined transform and the DOM node, a set of code that transforms the DOM node according to the defined transform; replace the DOM node with the set of code; and transmit, to a user device, the set of code to present the transformed DOM node at the user device.

In general, another aspect of the subject matter described in this specification can be implemented in systems. A system includes one or more processors and one or more memory elements including instructions. The instructions, when executed, cause the one or more processors to: identify, within a portion of code, a code template; parse the template to identify a defined transform and a DOM node to which the transform is to be applied; generate, based on the defined transform and the DOM node, a set of code that transforms the DOM node according to the defined transform; replace the DOM node with the set of code; and transmit, to a user device, the set of code to present the transformed DOM node at the user device.

These and other implementations can each optionally include one or more of the following features.

Particular implementations may realize none, one or more of the following advantages. A developer can use transforms to extend the syntax of a templating language. A transform can be used to transform a set of web page elements. A template compiler can generate code that is as efficient as code that is hand-optimized by a developer.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2A and illustrates an example code template.

FIG. 2B illustrates generated code generated based on a transform associated with an example code template.

FIG. 3 illustrates an example code template that includes nested transforms.

Like reference numbers and designations in the various drawings indicate like elements.

DETAILED DESCRIPTION

Code templates can be used for generating web pages included in a web site. A template processor (e.g., compiler) can parse a code template and generate code for a web page. When parsing the code template, the template processor can identify a defined transform that is to be applied to a DOM (Document Object Model) node included in the code template. The template processor can, for example, identify a selector for the defined transform in the code template. The template processor can determine that the selector corresponds to a transform class that defines the transform. The template processor can, using the transform class, generate code that transforms the DOM node according to the defined transform. The DOM node can be replaced, in the code template, with the generated code. The generated code can be transmitted to a user device for presentation of the transformed DOM node in a web page. The use of defined transforms can extend the syntax of the templating language, enabling developers to include custom transform selectors in code templates that are to be replaced with code generated using respective transforms.

Figure 1:
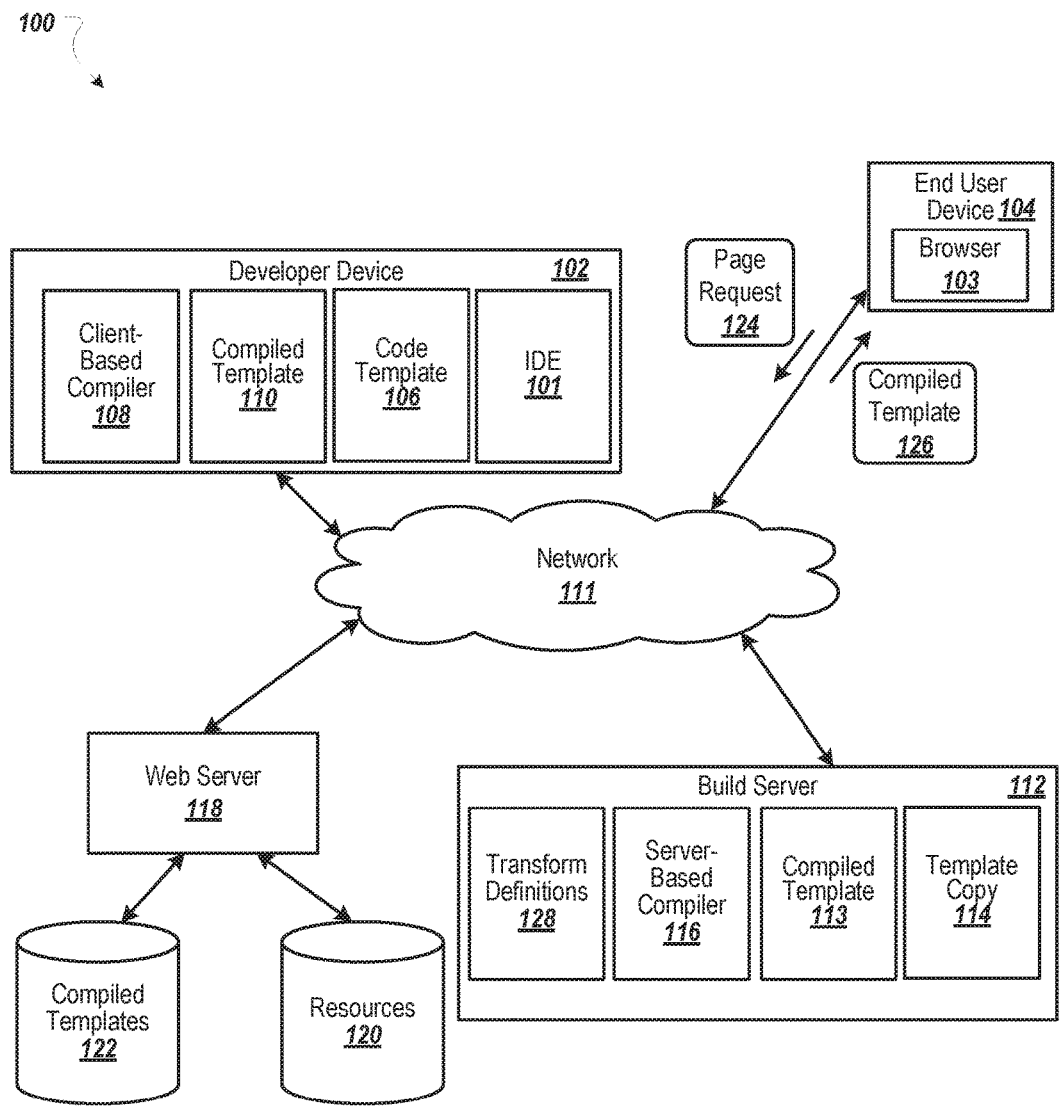
FIG. 1 is a block diagram of an example environment for template compilation.

FIG. 1 is a block diagram of an example environment 100 for template compilation. A developer can use an IDE (Integrated Development Environment) 101 of a developer device 102 to write code for a web page to be presented, for example, in a browser 103 on an end-user device 104. The developer can, for example, edit a code template 106. The developer can, at build time, use a client-based compiler 108 that is associated with the IDE 101 to compile the code template 106 to a compiled template 110. The developer can provide, e.g., over a network 111, the compiled template 110 to a build server 112 for storage on the build server 112 as a compiled template 113. As another example, the developer can provide the code template 106 to the build server 112 for storage as a template copy 114 and a server-based compiler 116 can compile the template copy 114 to the compiled template 113. The developer can use the IDE 101 to invoke the server-based compiler 116, for example. As another example, the server-based compiler 116 can be invoked as part of a build process that generates the compiled template 113, and other code, to be deployed to a web server 118.

The web server 118 can include various resources 120 for the web site and compiled templates 122 that include the compiled template 113. In response to a page request 124 received from the end-user device 104, the web server can provide the requested web page that includes a copy 126 of the compiled template 113, to the end-user device 104, for presentation of the web page in the browser 103. The browser 103 can execute code included in the requested web page, including the code in the copy 126 of the compiled template 113, to render the web page in the browser 103.

The code template 106 can include, for example, node elements (e.g., HTML and other elements), attributes, data placeholders, etc. The client-based compiler 108 and/or the server-based compiler 116 can generate code (e.g., JavaScript code) to create a DOM tree that represents the node elements and attributes that are included in the code template 106. The compiler 108 and/or the compiler 116 can generate code that creates object instances that represent the elements included in the code template 106 and code that modifies properties of the element instances and/or invokes methods of the object instances. For example, suppose that the code template 106 includes the following template code: <div class="c1"><span>Hello World</span></div>. The compiler 108 and/or the compiler 116 can generate the following code to generate a DOM tree portion that corresponds to the template code:

_div1=new DivElement( );
_div1.className="c1";
span=new SpanElement( );
span.text="Hello World";
_div1.nodes.add(span);
_nodes.add(_div1);

Compiling the code template 106 can result in various advantages. For example, compiling the code template 106 at build time can result in faster run time rendering of the web page as compared to an approach that uses run-time parsing and interpretation of the code template 106. As another example, template compilation can be used to generate optimized code that results in faster rendering as compared to non-optimized code. The compiled template 113 can include, for example, code optimizations that result in code that is as efficient as code that is hand-optimized by the developer. Using a compiler to generate optimized code can result in faster code development as compared to hand optimization and can enable optimization of large code sets which may be too large to be practically hand-optimized. Large code sets can include, for example, complex rendering of large web pages, such as web pages that include significant use of tables. Compiler code optimizations can include optimizations for efficient use and management of the DOM by the browser 103.

Creating efficient code for use and management of the DOM can include, for example, coding techniques that can achieve efficient node construction, efficient DOM updates (e.g., cache references, offline node updates), efficient synchronization of DOM reads and writes, efficient event handling (e.g., handling of delegation and throttling), efficient memory use and reduction of memory "garbage collection", aggregation of style property updates (e.g., use of "cssText" vs ".style.property"), efficient use of CSS selectors, and a reduction in size of the DOM.

Manual code optimization techniques can result in an increase of source code lines and in code that is difficult to read, understand, and maintain. Optimizing code using the compiler 108 and/or the compiler 116 can result in a more maintainable source code base, as compared to hand optimization. The compiler 108 and/or the compiler 116 can generate code for predefined elements and attributes. As described in more detail below, the compiler 108 and/or the compiler 116 can also generate code for a custom element or attribute that corresponds to a defined transform. Transforms can be used to extend the templating language used in the code template 106, for example. For example, a transform can be used to add new primitives, new attributes, and other source code items to the templating language used to create the code template 106 and other code templates.

A developer can define a transform class which describes how an instance of the transform class can be used to transform a set of one or more DOM elements into another set of one or more DOM elements. Transform definitions 128 can be stored at the build server 112, for example. When parsing the code template 106, the compiler 108 and/or the compiler 116 can identify a selector (e.g., a sequence of characters) that corresponds to a defined transform in the transform definitions 128 that is to be applied to a DOM node included in the code template 106. The compiler 108 and/or the compiler 116 can, using the transform class, generate code that transforms the DOM node according to the defined transform. The DOM node can be replaced, in the compiled template 113 (and in the compiled template copy 126 sent to the end user device 104), with the code generated using the transform class. The generated, optimized code included in the compiled template copy 126 can be executed by the browser 103 when the requested page is rendered.

FIGS. 2A and 2B respectively illustrate an example code template 200 and generated code 202 generated based on a transform associated with the code template 200. Line one of the code template 200 includes a "particle-element" element, which can signal to the compiler that code for a view with a name of "tools-cell" is to be generated and that the element may include a transform selector. A view is a visible portion of a web page. In general, a view can be represented in the code template 200 by a particle-element element or by some other portion of the code template 200.

The compiler can, when parsing the code template 200, determine that the attribute "if=" on a div element on line two of the code template 200 is a selector for a transform named ViewConditionalTransform. The ViewConditionalTransform can be configured to examine a Boolean value assigned to the "if=" selector (e.g., a "{ {selectable} }" value. The ViewConditionalTransform can return an empty view when the Boolean value is false and, when the Boolean value is true, return DOM elements (e.g., a non-empty view) that include the element on which the "if=" selector is configured (e.g., the div element) and any child elements of that element (e.g., a "mat-checkbox" element included on line three of the code template 200).

The compiler can, before processing the code template 200, process a set of import statements that direct the compiler to definitions of registered transforms and their associated selectors. The compiler can determine that "if=" is a selector associated with a registered ViewConditionalTransform transform. The compiler can, based on identifying the "if=" selector, generate code (e.g., code included in the generated code 202) that uses a ViewConditionalTransform instance to transform the div element that includes the "if=" selector.

The compiler can generate the generated code 202 as a replacement for the "tools-cell" particle element included in lines one to five of the code template 200. A ToolsCellView class, defined on lines two to forty five of the generated code 202, corresponds to the "tools-cell" particle-element element. The ToolsCellView class is an implementation of a predefined View base class. The ToolsCellView class can be used for visual presentation details related to the tools-cell element. The ToolsCellView class is associated with a TableRowToolsController class (e.g., an instance named "controller" that is declared on line four of the generated code 202) which is an implementation of a Controller base class. The TableRowToolsController instance can include business logic that is not directly related to visual presentation of data. Line eleven of the generated code 202 includes code to create the TableRowToolsController instance (e.g., the controller instance can be created when the associated view is created).

The generated code 202 includes, on lines five and six, declarations of element references corresponding to the particle-element and the div element, respectively, that are included in the code template 200. Line eight of the generated code 202 includes a declaration of a ViewConditionalTransform instance that corresponds to the "if=" selector included in the code template 200. Line seven of the generated code 202 includes a declaration of a view instance (e.g., "_toolscellview_0"), which is an instance of a view object that is returned when the div element is transformed by the ViewConditionalTransform instance.

In general, the compiler can generate code that transitions a view between a set of predefined states. Some or all of the code to transform a view between the predefined states can be provided, for example, in framework code included in the View base class, for example (or in code that is otherwise associated with the View base class). The states can include, for example, start, built, bound, attached, and detached. The states can be achieved, for example, through the invocation of constructor, build, bind, attach, and detach methods of a view object. When a view is constructed, a template object graph included in the template can be serialized to code to reconstruct a hierarchy of nodes and attributes.

The build method of a view can construct DOM nodes that are associated with the view. The root of the constructed tree can be made available through the node property of the view interface. The build method of the ToolsCellView class is defined on lines fourteen to twenty six of the generated code 202. Line fifteen of the generated code 202 includes code to create an element instance that corresponds to the particle-element element included in the code template 200. Line sixteen of the generated code 202 includes code to add the element instance corresponding to the particle-element to the DOM. Line seventeen of the generated code 202 includes code to create a div element instance that corresponds to the div element included in the code template 200. Line eighteen of the generated code 202 includes code to append the div element instance to the element instance corresponding to the particle-element element.

Line nineteen of the generated code 202 includes code to create a ViewConditionalTransform instance that corresponds to the "if=" selector included in the code template 200. Line twenty four of the generated code 202 includes code to invoke a transform method of the ViewConditionalTransform instance. The transform method receives a new View instance (e.g., a view associated with the div element included in the code template 200), and returns another view (e.g., a transformation of the received view). For the ViewConditionalTransform, the transform method can be configured to return either the passed in view or an empty view, based on a Boolean value that is associated with the ViewConditionalTransform instance. The Boolean value appears in line two of the code template 200 as a "{ {selectable} }" value. This value can be a bound value, for example, that is provided by a data source, with logic to retrieve the value included in the controller instance associated with the ToolsCellView class (e.g., the controller instance is passed to the transform method on line twenty four of the generated code 202).

The transform method can access the Boolean value using a transformValue field. The transformValue field can be populated, for example, when a bind method of the ToolsCellView is invoked. For example, the bind method can be invoked initially when the view is created and then also invoked each time the underlying data source changes. In general, the bind method can create bindings for attributes on nodes and for any transforms that have bindable parameters. The bindings can be initialized by in-order traversal of the node tree associated with the view. Binding initialization can call methods to retrieve controller properties. Child components can construct DOM additional nodes if a child component includes one or more to transforms.

The bind method for the ToolsCellView class is defined on lines twenty eight to thirty three of the generated code. Line twenty nine of the generated code 202 includes code to assign the Boolean "selectable" value of the controller to the transformValue of the ViewConditionalTransform instance. The transform method of the ViewConditionalTransform instance can include code to examine the transformValue and to return the passed-in view if the transformValue is true and return an empty view if the transformValue is false.

The ToolsCellView class also includes an attachView method and a detachView method. When the attachView method is invoked, the root node of the view has been inserted into a live DOM. Both parent and child nodes have been built and bindings have executed at least once before the attachView method is called. The attachView method can call an attach method associated with the controller of the view. The detachView method can be called on a view before the view is removed from a live DOM. The detachView method can be called on a parent node of a view which in turn can call the detachView method of children of the parent. After all children are detached, the view can call the detach method of the controller of the view.

FIG. 3 illustrates an example code template 300 that includes nested transforms. The code template 300 is a partially-coded template that illustrates the nesting of transforms inside other transforms. A "custom" element 302 corresponds to a custom view component. The custom element 302 includes a table element 304. The table element 304 includes a table row ("tr") element 306.

The tr element 306 includes a "repeat" attribute (e.g., selector) 308, which corresponds to a defined repeater transform. The repeat attribute 308 is assigned to an expression that represents a collection of items. The repeater transform can be configured to generate a child view for each item in the collection of items. For example, the repeat attribute 308 is assigned to a "row in" expression 309, indicating that a repeater transform associated with the repeat attribute 308 is to generate a child view for each item in a collection that results from evaluating the "row in" expression 309. The child view of the tr element 306 is a table header (e.g., "th") element 310 included in the tr element 306.

The th element 310 includes a repeat attribute (e.g., selector) 318, which corresponds to the defined repeater transform. The repeat attribute 318 is assigned to a collection of items represented by a "column in" expression 319, indicating that a repeater transform associated with the repeat attribute 318 is to generate a child view for each item in a collection that results from evaluating the "column in" expression 319. The child view of the th element 310 includes a div element 312, a button element 314, and a shape element 316 that are each included in the th element 310.

The shape element 316 includes an "if=" selector 320 associated with the ViewConditionalTransform described above with respect to FIG. 2. The "if=" selector 320 is assigned to a { {column.isSortable} } Boolean value 322. The ViewConditionalTransform is configured to return a view corresponding to the shape element 316 if the column.isSortable value 322 is true, and to return an empty view (e.g., no elements) if the column.isSortable value 322 is false. For example, the shape element 316 can correspond to a selectable user interface control that enables the user to sort a column. A user interface control corresponding to the shape element can be displayed for a particular column only if sorting is supported for the particular column, for example.

Figure 4:
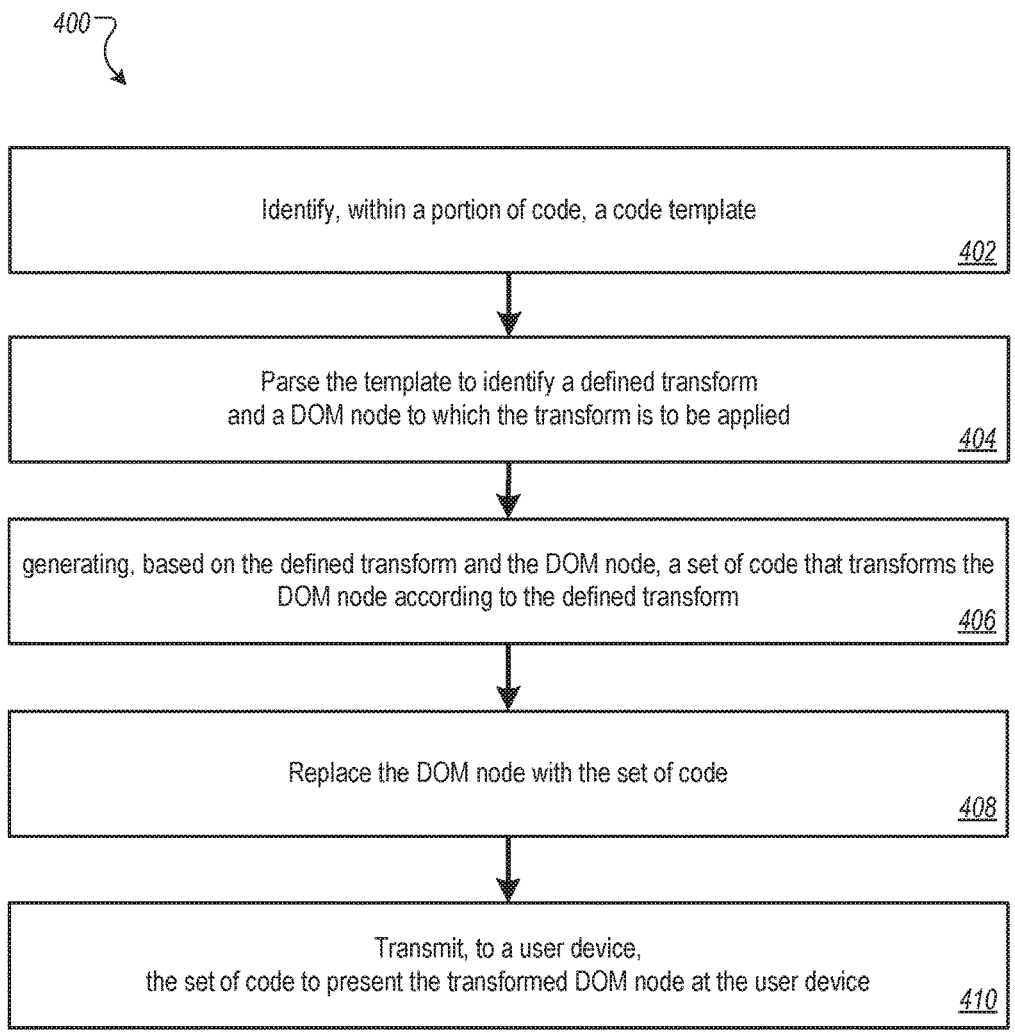
FIG. 4 is a flowchart of an example process for compiling a template.

FIG. 4 is a flowchart of an example process 400 for compiling a template. The process 400 can be performed, for example, by the client-based compiler 108 or the server-based compiler 116 described above with respect to FIG. 1.

At 402, a code template is identified within a portion of code. The portion of code can be, for example, template code that is being compiled by a template compiler. The template code can include one or more code templates.

At 404, the template is parsed to identify a defined transform and a DOM node to which the transform is to be applied. The defined transform can be identified, for example, based on a defined selector that is identified in the code template. The defined selector can be, for example, a string of characters that has been configured to be associated with a transform class. The compiler can, for example, import transform class definitions and identify selectors that have been associated with the transform class definitions. The compiler can determine when a compiled template includes a defined selector string. The compiler can identify the DOM node to which the transform is to be applied by determining a DOM node that includes the selector string (e.g., as an attribute of a code template element associated with the DOM node).

At 406, a set of code is generated, based on the defined transform and the DOM node, that transforms the DOM node according to the defined transform. Generating the set of code can include creating a new controller instance for the defined transform, constructing one or more DOM nodes for the defined transform, creating bindings for attributes on the one or more DOM nodes, calling a controller attach method, and calling a controller detach method. Generating the set of code can include generating code using the transform class.

For example, the compiler can use the transform class to transform the DOM element. For example, the transform class can accept a view that corresponds to the DOM element and can return another view that corresponds to a transformation of the DOM node, with the transformation being defined by a transform method of the transform class. A developer can implement the transform method for a particular class and provide the implemented transform method to the compiler, for invocation to perform a transformation.

A transform method of a ViewConditionalTransform can, for example, accept a view and a Boolean value and can return the view if the Boolean value is true and return an empty view if the Boolean value is false. A repeater transform can accept a view and a collection and return a list of views, one view for each item in the collection. For example, a repeater view can accept a view that is configured to display a telephone number and can repeat that view for a list of telephone numbers.

Other examples are possible. A drag and drop transform can accept a view and return the same view that is configured to support drag and drop operations. A dropshadow transform can accept a view and return the same view that is configured to be presented with a dropshadow style. An ifCached transform can accept a view and a Boolean value and return the same view if the Boolean value is true and can return a non-visible (e.g., cached) view if the Boolean value is false. An accessibility transform can accept a view and can return the same view with accessibility functionality enabled. In general, any transformation of a view can be defined using a transform. A transform can extend the syntax of the templating language, allowing a developer to request functionality defined by the transform by including, in the code template, a selector associated with the transform.

At 408, the DOM node is replaced with the set of code. For example, the compiler can include the set of code generated using the transform class as output code produced from compiling the code template.

At 410, the set of code is transmitted, to a user device, to present the transformed DOM node at the user device. The generated code can be included, for example, in a web page associated with a web site. A user request for the web page can be received. The generated set of code associated with the DOM node can be sent to the user device, in the web page, in response to the request. A browser on the user device can execute the generated code, which can result in presentation of the transformed DOM node, on the user device, as part of the rendering of the web page on the user device.

Figure 5:
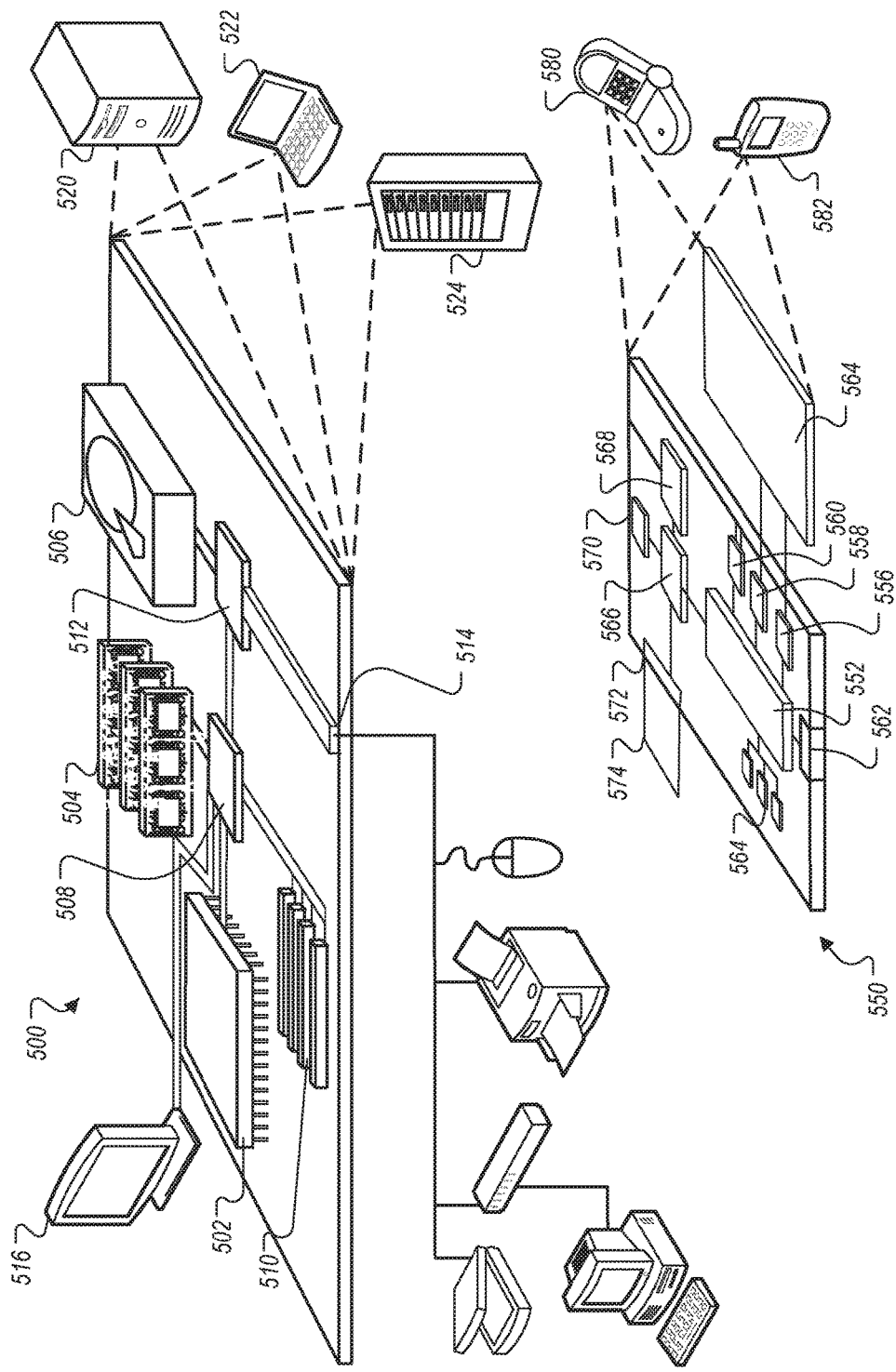
FIG. 5 is a block diagram of computing devices that may be used to implement the systems and methods described in this document, as either a client or as a server or plurality of servers.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be illustrative only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a computer-readable medium. The computer-readable medium is not a propagating signal. In one implementation, the memory 504 is a volatile memory unit or units. In another implementation, the memory 504 is a non-volatile memory unit or units.

The storage device 506 is capable of providing mass storage for the computing device 500. In one implementation, the storage device 506 is a computer-readable medium. In various different implementations, the storage device 506 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of duties is illustrative only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can process instructions for execution within the computing device 550, including instructions stored in the memory 564. The processor may also include separate analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD display or an OLED display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication (e.g., via a docking procedure) or for wireless communication (e.g., via Bluetooth or other such technologies).

The memory 564 stores information within the computing device 550. In one implementation, the memory 564 is a computer-readable medium. In one implementation, the memory 564 is a volatile memory unit or units. In another implementation, the memory 564 is a non-volatile memory unit or units. Expansion memory 574 may also be provided and connected to device 550 through expansion interface 572, which may include, for example, a SIMM card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS receiver module 570 may provide additional wireless data to device 550, which may be used as appropriate by applications running on device 550.

Device 550 may also communication audibly using audio codec 560, which may receive spoken information from a user and convert it to usable digital information. Audio codex 560 may likewise generate audible sound for a user, such as through a speaker, e.g., in a handset of device 550.

Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

What is claimed is:

1. A method, comprising:
    compiling a code template of source code, wherein compiling the code template of the source code comprises:
        identifying, within a portion of the source code, a code template;
        parsing the code template to identify, within the code template, a defined transform and a Document Object Model DOM node to which the transform is to be applied;
        generating, based on the defined transform and the DOM node, a set of code that transforms the DOM node according to the defined transform; and
        replacing, within the code template, the DOM node with the set of code that was generated based on the defined transform; and
    transmitting, to a user device, the compiled code template including the set of code to present the transformed DOM node in a web page at the user device.

2. The method of claim 1, wherein generating the set of code comprises:
    creating a new controller instance for the defined transform; and
    constructing one or more DOM nodes for the defined transform.

3. The method of claim 2, wherein generating the set of code further comprises, after creating the one or more DOM nodes, creating bindings for attributes on the one or more DOM nodes.

4. The method of claim 3, wherein generating the set of code further comprises calling a controller attach method.

5. The method of claim 4, wherein generating the set of code further comprises calling a controller detach method.

6. The method of claim 1, wherein the defined transform accepts a view and a Boolean value and returns the view when the Boolean value is true and returns an empty view when the Boolean value is false.

7. The method of claim 1, wherein the defined transform accepts a value and a collection and returns a copy of the view for each item in the collection.

8. A system comprising:
    one or more processors; and
    one or more memory elements including instructions that when executed cause the one or more processors to:
        compile a code template of source code, wherein compiling the code template of the source code comprises:
            identifying, within a portion of the source code, a code template;
            parsing the code template to identify, within the code template, a defined transform and a Document Object Model DOM node to which the transform is to be applied;

generating, based on the defined transform and the DOM node, a set of code that transforms the DOM node according to the defined transform; and replacing, within the code template, the DOM node with the set of code that was generated based on the defined transform; and transmit, to a user device, the compiled code template including the set of code to present the transformed DOM node in a web page at the user device.

9. The system of claim 8, wherein generating the set of code comprises:

creating a new controller instance for the defined transform; and constructing one or more DOM nodes for the defined transform.

10. The system of claim 9, wherein generating the set of code further comprises, after creating the one or more DOM nodes, creating bindings for attributes on the one or more DOM nodes.

11. The system of claim 10, wherein generating the set of code further comprises calling a controller attach method.

12. The system of claim 11, wherein generating the set of code further comprises calling a controller detach method.

13. The system of claim 8, wherein the defined transform accepts a view and a Boolean value and returns the view when the Boolean value is true and returns an empty view when the Boolean value is false.

14. The system of claim 8, wherein the defined transform accepts a value and a collection and returns a copy of the view for each item in the collection.

15. A computer program product tangibly embodied in a computer-readable storage device and comprising instructions that, when executed by a processor, cause the processor to:

compile a code template of source code, wherein compiling the code template of the source code comprises:

identifying, within a portion of the source code, a code template;

parsing the code template to identify, within the code template, a defined transform and a Document Object Model DOM node to which the transform is to be applied;

generating, based on the defined transform and the DOM node, a set of code that transforms the DOM node according to the defined transform; and replacing, within the code template, the DOM node with the set of code that was generated based on the defined transform; and transmit, to a user device, the compiled code template including the set of code to present the transformed DOM node in a web page at the user device.

16. The product of claim 15, wherein generating the set of code comprises:

creating a new controller instance for the defined transform; and constructing one or more DOM nodes for the defined transform.

17. The product of claim 16, wherein generating the set of code further comprises, after creating the one or more DOM nodes, creating bindings for attributes on the one or more DOM nodes.

18. The product of claim 17, wherein generating the set of code further comprises calling a controller attach method.

19. The product of claim 18, wherein generating the set of code further comprises calling a controller detach method.

20. The product of claim 15, wherein the defined transform accepts a view and a Boolean value and returns the view when the Boolean value is true and returns an empty view when the Boolean value is false.

* * * * *

UNITED STATES PATENT AND TRADEMARK OFFICE
CERTIFICATE OF CORRECTION

| | |
|---|---|
| PATENT NO. | : 10,331,781 B2 |
| APPLICATION NO. | : 15/616205 |
| DATED | : June 25, 2019 |
| INVENTOR(S) | : Buyukkokten |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 17 days.

Signed and Sealed this
Tenth Day of January, 2023

Katherine Kelly Vidal
*Director of the United States Patent and Trademark Office*